May 23, 1944. H. A. EVANS 2,349,709
ADHESIVE FABRIC AND METHOD OF MAKING THE SAME
Filed Aug. 12, 1941 5 Sheets-Sheet 1
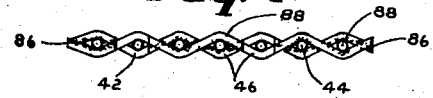
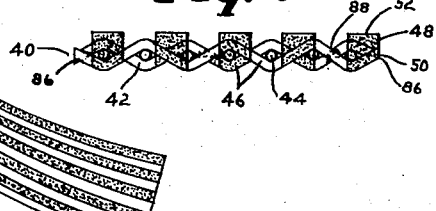
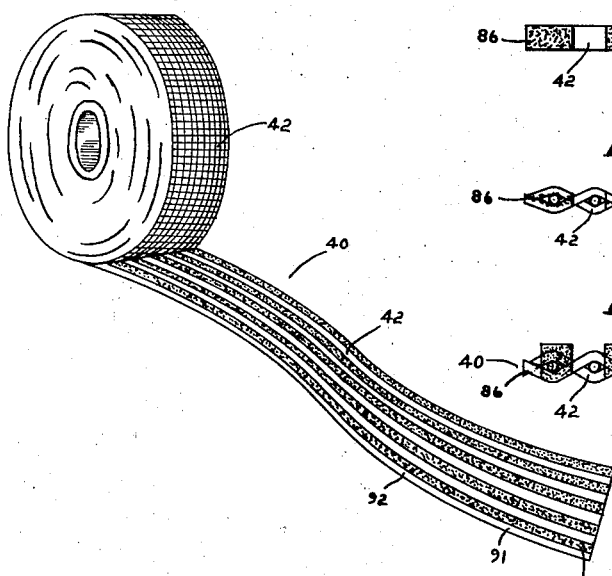
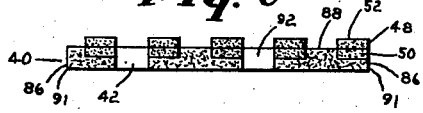
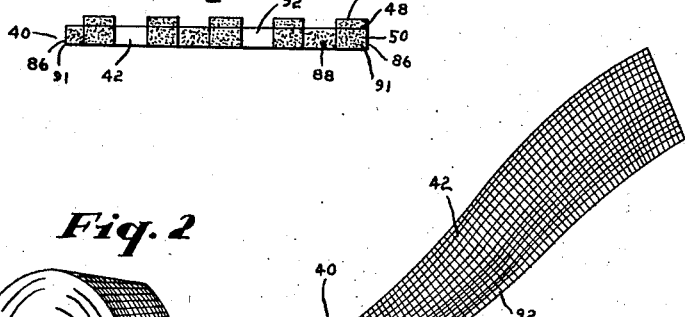
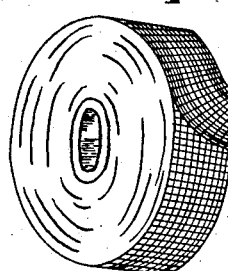
Inventor
Harold A. Evans
By Thomas A. Jenckes
Attorney May 23, 1944.   H. A. EVANS   2,349,709
ADHESIVE FABRIC AND METHOD OF MAKING THE SAME
Filed Aug. 12, 1941   5 Sheets-Sheet 2

Inventor
Harold A. Evans
By Thomas A. Jenckes
Attorney

Inventor
Harold A. Evans
By Thomas A. Jenches
Attorney

May 23, 1944. H. A. EVANS 2,349,709
ADHESIVE FABRIC AND METHOD OF MAKING THE SAME
Filed Aug. 12, 1941 5 Sheets-Sheet 4

Inventor
Harold A. Evans
By Thomas A. Jenckes
Attorney

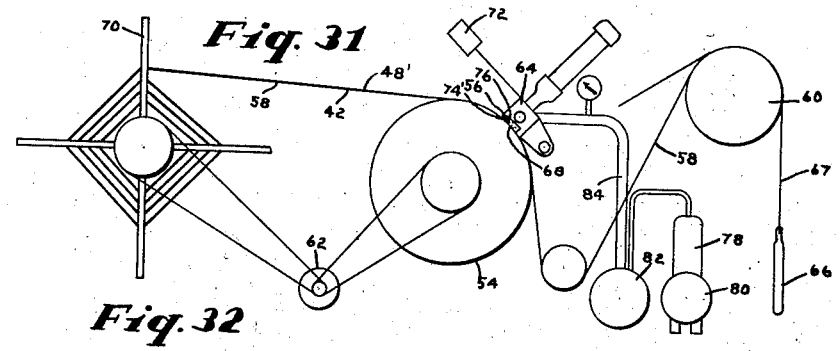
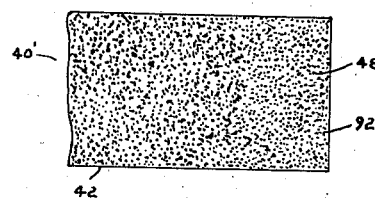
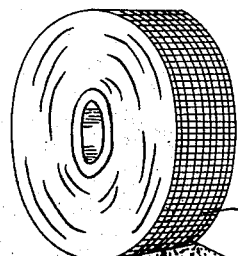
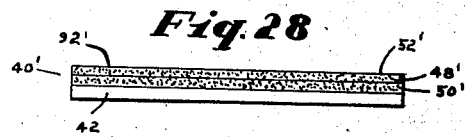
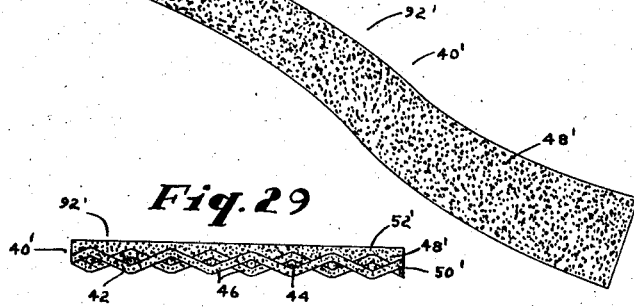
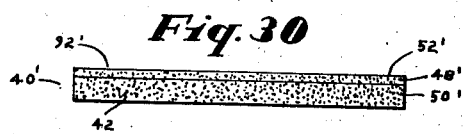

Patented May 23, 1944

2,349,709

UNITED STATES PATENT OFFICE 2,349,709

ADHESIVE FABRIC AND METHOD OF MAKING THE SAME

Harold A. Evans, Fairhaven, Mass., assignor to Coreve Corporation, Fairhaven, Mass., a corporation of Massachusetts Application August 12, 1941, Serial No. 406,519

9 Claims. (Cl. 117—44)

My invention relates to improvements in adhesive coated fabrics and methods of their manufacture.

While I am aware that others have attempted to coat woven fabrics with a layer of adhesive either as a continuous sheet or in intermittent areas throughout the length of said fabric, such as transversely spaced stripes or longitudinally spaced dots or areas, so far as I am aware no one has hitherto produced a fabric coated with an adhesive layer in which the adhesive layer is not only applied as a single layer covering a portion of the surface of the fabric, but also is applied as a layer of adhesive partially permeating said fabric forming a layer of adhesive underneath at least some of the threads thereof integral with said surface coated layer. I believe I am the first, therefore, to provied an adhesive fabric comprising a sheet of fabric having warp and weft threads and a single, preferably continuous layer of adhesive covering said fabric, portions of said layer of adhesive at least partially permeating said fabric to underlie at least some of said threads to positively lock said layer of adhesive thereto, whether said single layer of adhesive be applied to the fabric in sheet formation, in transversely spaced stripe formation, or in longitudinally spaced area formation. I am therefore able to provide an adhesive covered fabric in which the adhesive covering is so interlocked with the fibers that it is extremely hard to remove it from said fabric in use.

A further feature of my invention relates to the method I preferably employ for making such a fabric, said method including, providing a resilient, preferably rotatable pad, passing a sheet of fabric over said resilient pad and forcing a mass of liquid adhesive against said sheet of fabric and rotatable resilient pad under substantial gravity and fluid pressure to force a layer of said liquid adhesive within said fabric sheet underneath at least some of the threads thereof and to form a layer of adhesive on the surface of said fabric sheet integral with said permeated layer. In accordance with my preferred embodiment of my method, I preferably superimpose over a rotating pad cylinder, a stationary fountain on said sheet of fabric passing thereover under substantial gravity pressure to positively provide a liquid adhesive dam and I continuously force a mass of liquid adhesive from said stationary fountain under substantial fluid pressure into said fabric and through passageway means, preferably of progressively decreasing height to additionally compact and force the layer of adhesive within the fabric as said sheet of fabric passes between the nip formed between said stationary fountain and rotating resilient pad. I believe I am the first, therefore, to provide a dam by simulating the action of a stamp on its cooperating pad, making the stamp function as a fountain to apply liquid adhesive through said fountain to the sheet of fabric passing underneath said fountain under gaseous fluid pressure.

These and such other objects of my invention as may hereinafter appear will be best understood from a description of the accompanying drawings which illustrate improved types of adhesive fabric constructed in accordance with my invention and illustrate diagrammatic steps in the manufacture thereof.

Figs. 1-7 illustrate an air-pervious surgical tape comprising non-bias cut woven fabric coated and permeated with spaced stripes by my improved method and having the edges thereof pretreated against unraveling, Fig. 1 being a perspective view illustrating a roll of such surgical tape and showing a portion of the inner surface thereof; Fig. 2 being a perspective view of a roll of such surgical tape and showing a portion of the outer surface thereof; Fig. 3 being a diagrammatic sectional view showing the tape pretreated with my method to provide latex stripes to prevent the edges from unraveling after a sheet of substantial width is cut to the desired tape widths shown; Fig. 4 being a sectional view similar to Fig. 3 but showing the actual threads so permeated with said stripes of latex; Fig. 5 being a sectional view of the fabric shown in Fig. 4 after it has been again treated with my method to superimpose stripes of adhesive thereon; Fig. 6 being a diagrammatic sectional view of an embodiment of completed tape showing the adhesive stripes partially permeated through the threads of the tape; and Fig. 7 being a diagrammatic view of an embodiment of completed tape showing the adhesive stripes on the surface thereof and stripes integral therewith completely permeated through the tape fabric.

Figure 14:
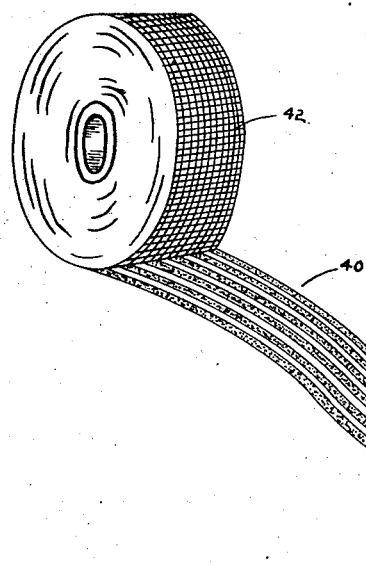
Figure 17:
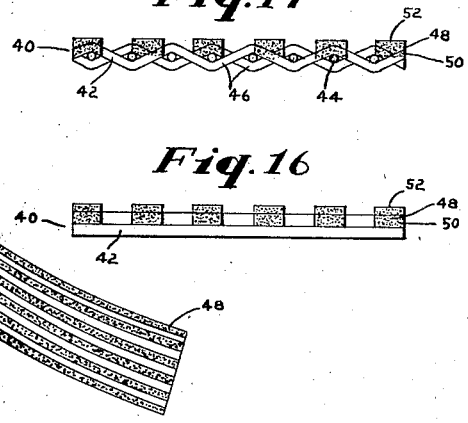
Figure 16:
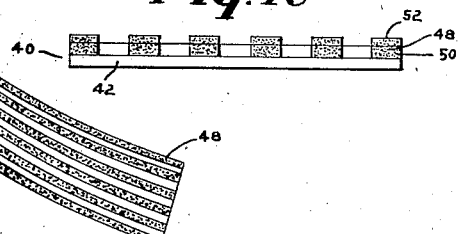
Figure 18:
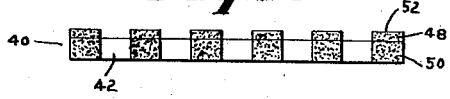
Figure 15:
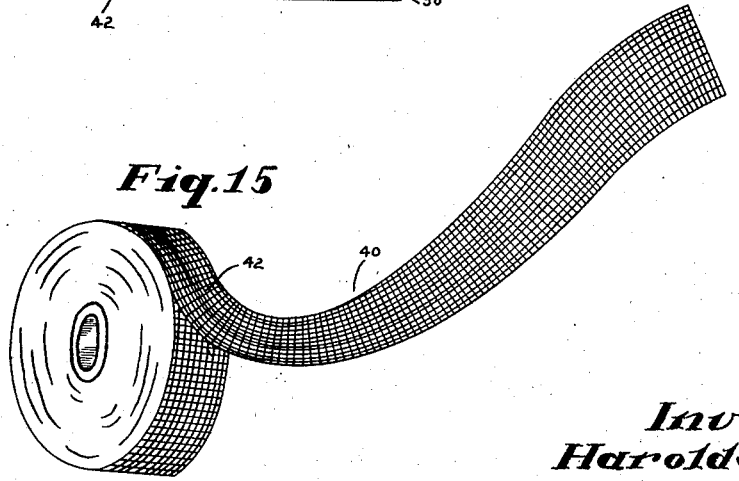

Figs. 14-19 illustrate an air-pervious surgical tape comprising non-bias cut woven fabric coated and permeated with spaced stripes of adhesive by my improved method, Fig. 14 being a perspective view illustrating a roll of such surgical tape and showing a portion of the inner surface thereof; Fig. 15 being a perspective view of a roll of such surgical tape and showing a portion of the outer surface thereof; Fig. 16 being a diagrammatic sectional view of an embodiment of surgical tape showing the adhesive stripes partially permeating the fabric; Fig. 17 being a sectional view similar to Fig. 16 but showing the actual threads so partially permeated with stripes of adhesive; Fig. 18 being a diagrammatic sectional view of an embodiment of completed tape showing the adhesive stripes on the surface thereof and stripes integral therewith completely permeating the fabric; and Fig. 19 being a sectional view similar to Fig. 18 but showing the actual threads so permeated with the adhesive stripes.

Figure 19:
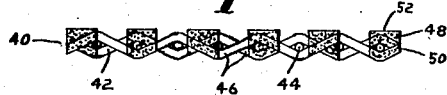
Figure 20:
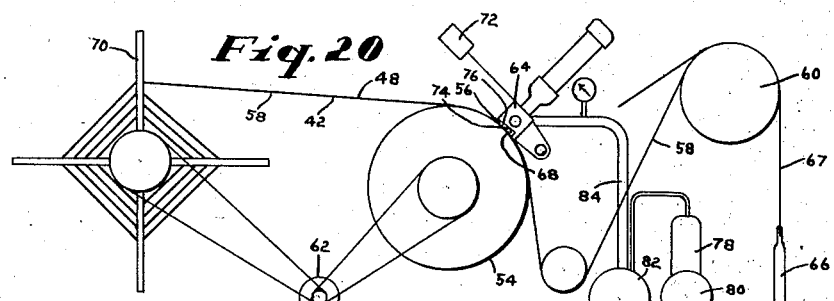

Fig. 20 is a diagrammatic side elevational view illustrating the steps in my improved method for making the adhesive fabric shown in Figs. 14-19, with the gravity and fluid pressure so regulated as to provide the stripes only partially permeating the fabric, as shown in Figs. 16 and 17.

Figure 21:
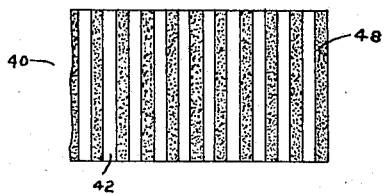

Fig. 21 is a face view of a small portion of such a fabric.

Figure 22:

Fig. 22 is a detailed cross-sectional view thereof.

Figure 23:
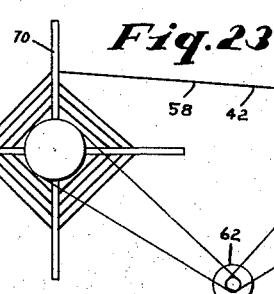

Fig. 23 is a diagrammatic side elevational view illustrating the steps in my improved method for making the adhesive fabric shown in Figs. 14-19, with the gravity and fluid pressure so regulated as to provide the stripes completely permeating the fabric, as shown in Figs. 18 and 19.

Figure 24:
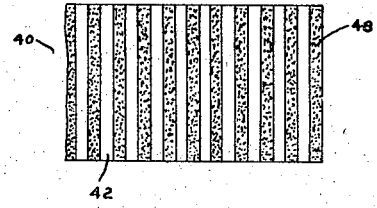

Fig. 24 is a face view of a small portion of such a fabric.

Figure 25:
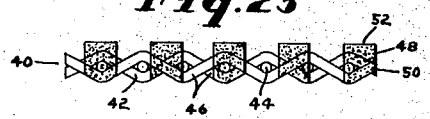

Fig. 25 is a detailed cross-sectional view thereof.

Figs. 26-30 illustrate a commercial tape comprising non-bias cut woven fabric coated and permeated with an adhesive sheet in accordance with my improved method, Fig. 26 being a perspective view illustrating a roll of such commercial tape and showing a portion of the inner surface thereof; Fig. 27 being a diagrammatic sectional view of an embodiment of commercial tape showing the adhesive sheet partially permeating the fabric; Fig. 28 being a sectional view similar to Fig. 27 but showing the actual threads so partially permeated with a sheet of adhesive; Fig. 29 being a diagrammatic sectional view of an embodiment of completed tape showing an adhesive sheet on the surface thereof and an adhesive sheet integral therewith completely permeating the fabric; and Fig. 30 being a sectional view similar to Fig. 29 but showing the actual threads so permeated with the adhesive sheet.

Fig. 31 is a diagrammatic side elevational view illustrating the steps in the method of making the embodiment of adhesive fabric shown in Figs. 26-30.

Fig. 32 is a face view of such a fabric.

In the drawings, wherein like characters of reference generally indicate like parts throughout, 40 generally indicates an adhesive fabric constructed in accordance with my invention. Said fabric includes a sheet of fabric 42 having warp threads 44 and weft or filling threads 46 and a continuous preferably single layer of adhesive 48 at least partially permeating said fabric forming a layer of adhesive 50 underneath at least some of the threads and a layer of adhesive 52 on the surface of said fabric integral with said permeated layer 50. If desired, said permeated layer 50 may partially permeate said fabric forming a layer of adhesive underneath at least some of the threads, as shown in Figs. 16 and 17, or it may completely permeate the fabric as shown in Figs. 18 and 19. To put the matter another way, I provide an adhesive fabric 40 comprising a sheet of fabric 42 having warp threads 44 and weft threads 46 and a continuous single layer 48 of adhesive having portions 52 covering said fabric and portions 50 of said same single layer 48 of adhesive at least partially permeating said fabric 42 to positively underlie and lock said entire layer 48, including the coated portion 52 to said fabric. It is immaterial whether said single layer 48 of adhesive be applied as a continuous layer extending longitudinally of the fabric, or as an intermittent layer comprising longitudinally spaced areas of adhesive on the face of the fabric. If desired, said layer may comprise the spaced stripes of adhesive 48 comprising said single layer covering said fabric, portions 50 of said spaced stripes of adhesive at least partially permeating said fabric to underlie at least some of said threads to positively lock said spaced stripes 48 of adhesive, including the covering portions 52 thereof to the fabric 42. If desired, however, as in the embodiment shown in Figs. 26-30, said layer 48' may comprise a continuous sheet 48' completely covering said fabric having a portion 52' covering said fabric and a portion of the same sheet 50' at least partially permeating said fabric 42 to underlie at least some of the threads 44 and 46 thereof to positively lock said integral sheet 48' of adhesive including the portion 52 thereof exposed on the surface thereof thereto.

Great difficulty has been experienced in the prior art in providing an adhesive fabric in which the covered layer of adhesive will not tear off if it is not permeatably locked to the fabric. It is obvious that with my invention employing at least portions 50 of said layer of adhesive 48 at least partially permeating said fabric 42 to underlie at least some of said threads 44 and 46, they will so positively lock said adhesive layer 48 to the sheet of fabric 42 that it will not pull therefrom in use.

So far as I am aware, such a type of adhesive fabric 40 or 40' having the adhesive layer 48 or 48' positively interlocked therewith in the manner hitherto described can only be made in accordance with my improved method. Broadly speaking, my improved method comprises the method of making adhesive fabric 40 or 40' which comprises continuously passing a sheet of fabric 42 over a resilient pad 54 and forcing preferably continuously a mass of liquid adhesive 56 against said sheet of fabric 42 under substantial gravity and fluid pressure to force at least a portion 50 or 50' of the layer 48 or 48' of said liquid adhesive within said fabric sheet 42 underneath at least some of the threads 44 and 46 thereof and to form a layer of adhesive 52 or 52' on the surface of said fabric sheet integral with said permeated layer 50 or 50', it being immaterial whether said layer 48 or 48' is permeated within and covers said fabric as a single layer in the form of a continuous sheet 48' or in the form of continuously transversely spaced longitudinal stripes to provide the stripes 48, or whether said continuous sheet or continuous stripes are broken to form intermittent longitudinally and/or transversely spaced areas of said permeated adhesive.

I thus pass a continuous sheet 58 of fabric 42 from a suitable source of supply, such as the roll 60 over a pad cylinder 54 having a resilient outer surface suitably driven in any suitable manner, as by the motor 62. I then superimpose a relatively stationary fountain 64 on said sheet of fabric 58 passing over said rotating pad cylinder 54 under substantial gravity pressure, which may be conveniently provided by pivoting the fountain 64 on a pivot rod extending transversely of the cylinder above the fabric so that the weight of the fountain will bear against the continuous sheet of fabric 58 passing over the surface of the resilient pad 54. If desired, the sheet of fabric 58 may be suitable braked in any suitable manner, such as by the counter weight 66 mounted on a strap 67 passing over the roll 60 to retain it in a taut condition until it passes between the nip 68 formed between the fountain 64 and said resilient pad cylinder 54. After the continuous sheet of fabric 58 has passed through the nip 68, it may then be taken up in any suitable manner, such as on the reel 70, suitably rotated in any suitable manner, such as by the motor 62 to draw said continuous sheet of fabric in a taut condition from the nip 68 to said reel 70. A suitably variable counter weight 72 may be added to the fountain 64 to increase the gravity pressure of the fountain against the sheet 58 passing thereunder and the pad cylinder 54 so that the fountain 64 may function as a hollow stamp so firmly impressed against the fabric and the resilient surface of the pad cylinder that no leakage around the edges of the hollow stamp is possible. I then force a mass of liquid adhesive 56 through said stationary fountain 64 under substantial fluid pressure as a single layer into said sheet of fabric 58 passing thereunder, and I preferably simultaneously leave a portion 52 of said single layer on the surface of said fabric by providing passageway means 74 on the lower surface of said fountain 64 behind the points at which the adhesive is forced into said fabric 58 to provide passageway means 74 between the rear portion of the fountain 64 and the pad cylinder 54 underneath it to force a layer 50 of liquid adhesive within said fabric sheet and underneath at least some of the threads thereof and simultaneously a layer 52 of adhesive on the surface of said fabric sheet integral with said permeated layer 50. In order that the portion 50 of said layer may be impregnated within said fabric and the surface portion 52 thereof compactly laid on said fabric sheet 58, said passageway means 74 is preferably provided of progressively decreasing height, as at 76, for this purpose. Any suitable means may be provided to force the liquid adhesive 56 under adjustably variable substantial fluid pressure from the fountain 64, such as the source of fluid pressure 78 comprising the compresser 78 actuated by the pump 80 forcing compressed air within the liquid adhesive container 82 to force it through the pipe 84 to within a suitable reservoir (not shown) within the fountain 64. While I have shown a suitable apparatus capable of carrying out my method, it is obvious that my improved method may be accomplished manually or in any other suitable type of apparatus. It is obvious that the gravity pressure aids in compacting the layer 48 of adhesive and forcing the portion 50 thereof within the fabric, but that this permeation of the layer 48 within said fabric as at 50 is largely accomplished by the application of the fluid pressure and by the compacting of the layer 52 on the surface of the fabric 58 caused by the decreasing size of the passageway means 74. It is obvious, however, that substantial permeation or penetration of the fabric will take place if the size of the passageway means 74 is not varied throughout its length. It is obvious that the fluid pressure must be so regulated as to be not greater than the gravity pressure causing the fountain 64 to bear against the pad cylinder 54 so as to cause a bleeding or leakage of liquid adhesive around the edges of said fountain or a complete blowout of liquid adhesive at this point. If it be desired to provide spaced stripes 48 of adhesive on the fabric the passageway means may comprise a plurality of spaced channels or grooves 74 as shown in Figs. 8, 10, 20, and 23. If it be desired to provide a continuous sheet 48' of adhesive on the fabric the passageway means may comprise continuous transverse slot 74' as shown in Fig. 31.

Figure 8:
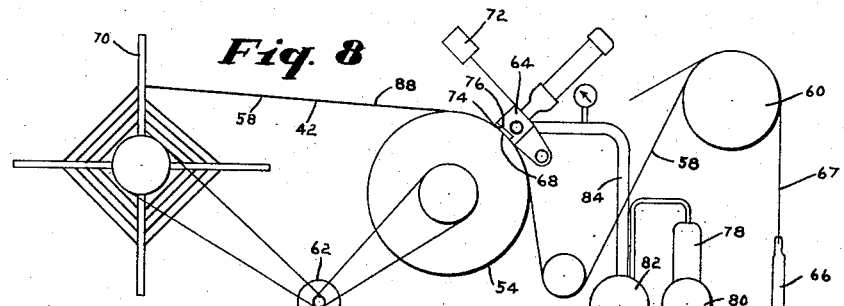
Fig. 8 is a diagrammatic side elevational view illustrating the steps in my method of making the adhesive fabric shown in Figs. 1-7 to provide the spaced longitudinal stripes of latex shown therein.
Figure 9:
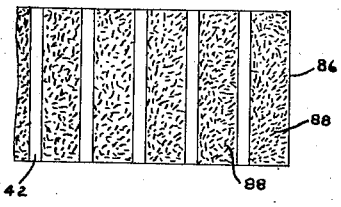
Fig. 9 is a face view of the fabric after the latex stripes have been formed therein in accordance with my method.
Figure 10:
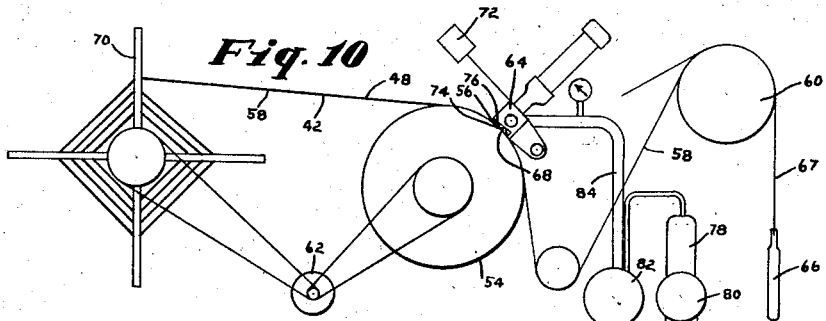
Fig. 10 is a diagrammatic side elevational view illustrating the steps in my improved method of making the adhesive fabric shown in Figs. 1-7 to superimpose the spaced stripes of adhesive thereon.
Figure 11:
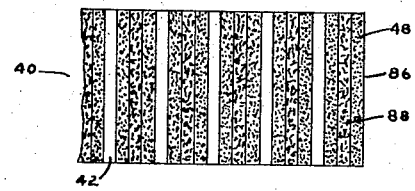
Fig. 11 is a face view of the completed fabric shown in Figs. 1-7.
Figure 12:
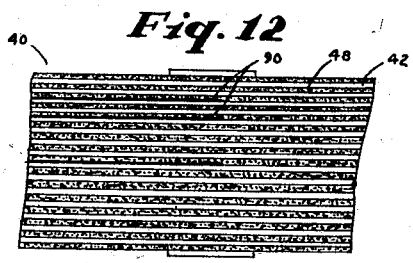
Fig. 12 is a diagrammatic view illustrating how the wide sheet of fabric treated in accordance with my method is then cut centrally of said latex stripes into the desired widths for adhesive or surgical tape.
Figure 13:
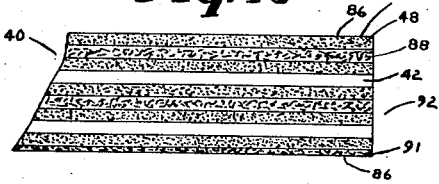
Fig. 13 is a face view of the fabric so cut along said latex stripes to provide a narrow surgical tape having edges incapable of unraveling.

Any suitable type of adhesive may be employed, which adhesive may be applied hot or in solution, preferably in solution to provide when affixed a pressure sensitive adhesive. I have shown in Figs. 1-7 an air-pervious surgical tape 92 comprising non-bias cut woven fabric coated with the spaced stripes 52 and permeated with the spaced stripes 50 integral therewith to make up the integral composite stripes 48, cut into suitable widths for surgical tape, as shown in Figs. 12 and 13, and having the edges 86 thereof pretreated against unraveling. This may be done by treating the sheet of fabric 58 with two separate applications of my improved method, in the first instance applying the wide stripes 88 of normal latex in liquid form thereto in accordance with my method, as shown in Fig. 8. The fabric 58 may then be treated a second time in accordance with my method in the manner shown in Fig. 10 to affix the narrow stripes of adhesive 48 to the fabric, including the exposed portions 52 thereof, and the portions 50 thereof permeated at least partially through said fabric, in the embodiment shown in Fig. 6 being partially permeated therethrough, and in the embodiment shown in Fig. 7 said portions 50 being substantially totally permeated through the fabric 42. It is thus obvious that I have provided a novel type of non-bias cut surgical tape having longitudinally extending warp threads 44 and the transverse weft or filling threads 46 with the latex stripes 88 impregnated within the fabric. The fabric is then cut through the latex stripes 88, such as by the knives 90 diagrammatically illustrated by Fig. 12 to provide areas 91 impregnated with latex adjacent the edges of the fabric covering the exposed ends of the filling threads 46 and the warp threads 44 adjacent said edges to prevent them from unraveling, and at the same time longitudinally splitting said fabric 58 into the desired widths of surgical tape 92.

I have shown in Figs. 14-19 an alternative embodiment of my invention comprising an air-pervious surgical tape to which the pressure sensitive adhesive employed in the embodiment shown in Figs. 1–7 is also employed in stripe formation 48, preferably with the coated stripes 52 and the permeated stripes 50 integral therewith. If desired, my improved method may be employed with fabric cut on the bias to provide a comformable and stretchable fabric in the manner shown and described in my co-pending application for patent for Adhesive fabric and method of manufacturing same, Ser. No. 406,888, filed August 14, 1941. In the embodiment shown in Figs. 16 and 17, the stripes 50 are only permeated part way through the fabric, whereas in the embodiment shown in Figs. 18 and 19 the stripes 50 are permeated all the way through.

I have shown in Figs. 26–30 my invention applied to a so-called commercial or masking tape 52'. As shown in Fig. 31, the fabric has been treated identically as shown in Figs. 20 and 23, only the passageway means 74' is so shaped as to apply the adhesive in sheet formation 48' with a single coat providing the sheet 50' partially permeating the fabric, and the sheet 52' integral therewith covering the fabric. This type of fabric may be employed in any place where so called commercial or masking tape is employed, either for true masking in painting or spraying, or as a binder, reinforcement, or otherwise. In the embodiment of my invention shown in Figs. 27 and 28, the sheet 50' is permeated partially through the fabric, whereas in the embodiment of my invention shown in Figs. 29 and 30, the sheet 50' is permeated substantially through the fabric.

It is apparent, therefore, that I have provided a novel type of adhesive fabric in which the affixed adhesive will positively not tear away from the fabric base thereof in use, with the other advantages explained above, and the improved method of its manufacture.

It is understood that my invention is not limited to the specific embodiments shown or methods described and that various deviations may be made therefrom without departing from the spirit and scope of the appended claims.

What I claim is:

1. In the method of coating fabric between a moving resilient surface and a stationary fountain having adhesive feeding means, the steps which comprise forcing said fountain against said resilient surface to provide a traction nip for feeding said fabric between said surface and fountain and to provide a dam exterior of said adhesive feeding means, and forcing liquid adhesive through said adhesive feeding means under sufficient pressure to force a layer of said liquid adhesive within said fabric sheet and underneath at least some of the threads thereof and to form a layer of adhesive on the surface of said fabric sheet integral with said permeated layer.

2. In the method of coating fabric between a moving resilient surface and a stationary fountain having adhesive feeding means, the steps which comprise forcing said fountain against said resilient surface to provide a traction nip for feeding said fabric between said surface and fountain and to provide a dam exterior of said adhesive feeding means, and continuously forcing liquid adhesive through said adhesive feeding means under sufficient pressure to force a continuous layer of said liquid adhesive within said fabric sheet and underneath at least some of the threads thereof and to form a continuous layer of adhesive on the surface of said fabric sheet integral with said permeated continuous layer.

3. In the method of coating fabric between a moving resilient surface and a stationary fountain having adhesive feeding means comprising slots, the steps which comprise forcing said fountain against said resilient surface to provide a traction nip for feeding said fabric between said surface and fountain and to provide a dam exterior of said adhesive feeding means, and continuously forcing liquid adhesive through said adhesive feeding means comprising slots under sufficient pressure to force continuous stripes of said liquid adhesive within said fabric sheet and underneath at least some of the threads thereof and to form continuous stripes of adhesive on the surface of said fabric sheet integral with said permeated continuous stripes.

4. In the method of coating fabric between a moving resilient surface and a stationary fountain having adhesive feeding means, the steps which comprise forcing said fountain against said resilient surface to provide a traction nip for feeding said fabric between said surface and fountain and to provide a dam exterior of said adhesive feeding means, and intermittently forcing liquid adhesive through said adhesive feeding means under sufficient pressure to force spaced areas of said liquid adhesive within said fabric sheet and underneath at least some of the threads thereof and to form spaced areas of adhesive on the surface of said fabric sheet integral with said permeated spaced areas.

5. Adhesive fabric comprising a sheet of fabric having warp and weft threads and a continuous single layer of adhesive covering said fabric, portions of said layer of adhesive partially permeating said fabric to underlie some of said threads to positively lock said layer of adhesive thereto produced substantially in accordance with the method claimed in claim 2.

6. Adhesive fabric comprising a sheet of fabric having warp and weft threads and a continuous sheet of adhesive covering said fabric, portions of said sheet of adhesive partially permeating said fabric to underlie some of said threads to positively lock said sheet of adhesive thereto produced substantially in accordance with the method claimed in claim 2.

7. Adhesive fabric comprising a sheet of fabric having warp and weft threads and continuous spaced stripes of adhesive comprising single layers covering said fabric, portions of said spaced stripes of adhesive partially permeating said fabric to underlie some of said threads to positively lock said spaced stripes of adhesive thereto produced substantially in accordance with the method claimed in claim 3.

8. Adhesive fabric comprising a sheet of fabric having warp and weft threads and spaced areas of adhesive covering said fabric, portions of said spaced areas of adhesive partially permeating said fabric to underlie some of said threads to positively lock said spaced areas of adhesive thereto produced substantially in accordance with the method claimed in claim 4.

9. Adhesive fabric comprising a sheet of fabric having warp and weft threads and areas of adhesive covering said fabric, portions of said areas of adhesive partially permeating said fabric to underlie some of said threads to positively lock said areas of adhesive thereto produced substantially in accordance with the method claimed in claim 1.

HAROLD A. EVANS.